(12) United States Patent
Sabry (10) Patent No.: US 8,759,235 B2
(45) Date of Patent: Jun. 24, 2014

(54) ORTHOPEDIC PRAYER MAT

(76) Inventor: Nader Sabry, Calgary (CA)

(*) Notice: Subject to any disclaimer, the term of this patent is extended or adjusted under 35 U.S.C. 154(b) by 4 days.

(21) Appl. No.: 13/104,047

(22) Filed: May 10, 2011

(65) Prior Publication Data

US 2012/0288663 A1 Nov. 15, 2012

(51) Int. Cl.
B32B 33/00 (2006.01)
A63B 6/00 (2006.01)
B32B 27/40 (2006.01)

(52) U.S. Cl.
USPC ........... 442/124; 428/212; 428/903; 428/156; 428/160; 428/213; 442/101; 442/123; 442/340; 442/85; 442/221; 442/223; 442/224; 442/370; 442/372; 442/373; 5/417; 5/420

(58) Field of Classification Search
CPC ............... B32B 27/06–27/08; B32B 27/12; B32B 27/40; B32B 2307/744; B32B 2307/7145; B32B 3/26–3/263
USPC ......... 442/221, 222, 223, 224, 225, 260, 277, 442/278, 280, 281, 286, 293, 370, 371, 372, 442/373, 394, 396, 399, 101; 428/95–97
See application file for complete search history.

(56) References Cited

U.S. PATENT DOCUMENTS

| | | | | |
|---|---|---|---|---|
| 5,203,041 A * | 4/1993 | Alonso | ............................. | 5/420 |
| 6,065,164 A * | 5/2000 | Swanger et al. | .................. | 5/420 |
| D674,229 S * | 1/2013 | Roberts et al. | ................. | D6/605 |
| 2004/0250346 A1 * | 12/2004 | Vasishth | ........................... | 5/417 |
| 2005/0005358 A1 * | 1/2005 | DuDonis | .......................... | 5/632 |
| 2006/0177626 A1 * | 8/2006 | Johnson et al. | .................. | 428/99 |
| 2007/0275827 A1 * | 11/2007 | Glaser | ............................. | 482/23 |
| 2009/0192028 A1 * | 7/2009 | Shank | ........................... | 482/148 |
| 2009/0223411 A1 * | 9/2009 | Higgins et al. | ............. | 106/287.1 |
| 2009/0276957 A1 * | 11/2009 | Boitet-Ball | ....................... | 5/420 |
| 2012/0260421 A1 * | 10/2012 | DeGregorio | ..................... | 5/417 |

OTHER PUBLICATIONS

Ginty, Beware of Germs, Yoga Journal Magazine, Jun. 28, 2009.*

* cited by examiner

*Primary Examiner* — Jennifer Chriss
*Assistant Examiner* — Frank Vineis
(74) *Attorney, Agent, or Firm* — Birch, Stewart, Kolasch & Birch, LLP (57) ABSTRACT

A new orthopedic prayer mat proposed, whereas the new orthopedic prayer mat has a multiple layered structure. The top layer is made from microfiber which is antimicrobial, anti-molding, water-resistant, anti-dust and heat-resistant. The bottom layer is an anti-slip layer to prevent the user from physical injury in any situation while using the mat, and a soft polyurethane layer and an anti-fatigue layer or a hard polyurethane layer are arranged between the top microfiber layer and the bottom anti-slip layer in order to absorb pressure pressure and providing support, and the soft and hard polyurethane layer are combined at an angle to adjust the ratio of the weight-absorption and bearing to form the orthopedic prayer mat. Further the angle between the layers is tailored for users according to user's weight, height, body structure type and healthy conditions.

13 Claims, 8 Drawing Sheets

ORTHOPEDIC PRAYER MAT

FIELD OF THE INVENTION

This invention relates to a mat and particularly to an orthopedic prayer mat, which comprises multiple layers, and those layers are designed to have advantages of reducing fatigue, easing pressure and increasing the feeling of comfort including increasing blood circulation.

DESCRIPTION OF THE RELATED ART

A mat is used in prayer or meditation, and there are different activities in prayer, such as bending, standing, kneeling and sitting. Such activities, if not properly supported, cause discomfort and stress, like back pain, knee stiffness, poor circulation, arthritis . . . and so on.

The prayer mat may be too hard or too soft. When a user is in bending or standing posture and the prayer mat is too hard, the back, spine and shank are stressed and if the posture is prolonged or used several times over a long time, it causes discomfort and stiffness in the user. When the user is in kneeling and sitting posture, the back, spine, leg and circulation are stressed in some area, and for a long time, those activities cause pain and numbness. On the contrary, when the prayer is too soft, the user have to use more strength to keep his/her balance causing an improper weight distribution, so the user may have discomfortable or even aching feelings associated with his/her feet, ankle, shins, knee and spine.

The softer prayer mat is suitable for some users for more weight absorption but less bearing, and the harder mat is suitable for others for less weight absorption but more bearing. However the conventional prayer did not have the adjustment mechanism for different users.

Also, the top layer of the mat facing the user interacts with the user's feet, leg or head which can cause perspiration, potentially causes many discomforts, and when the user is standing or bending, on a damp mat, it causes discomfort and further the damp surface can also potentially mold and that potential harms the user's health.

A new prayer mat is proposed and is explained as follows. The proposed prayer mat may ease back, knee, ankle, leg pain . . . and so on, and further the mat may stimulate blood circulation and reduce the pressure on ankles and feet, and the proposed mat is easily tailored for user to have the most comfort. Further, the proposed mat has the advantage that the user can view the footprint to improve the posture.

SUMMARY OF THE INVENTION

According to an aspect of this invention, a mat is designed to be anti-dust, water-resistant, heat-resistant, antimicrobial and/or anti-mold and has a soft and silky surface to keep dry and clean and to make the user comfortable. The mat surface is also designed to allow for printing or embossing for designs or illustration on the surface.

According to an aspect of this invention, a mat is designed to absorb the initial pressure from the user to ease the stiffness and to relax any shin irritation from friction or press whole interacting with the mat and muscle support and relief. Also, a mat is designed to have a slow recovery effect to allow the user to observe his/her foot print and the weight distribution.

According to an aspect of this invention, a mat is designed to bear and absorb user's weight to provide the support and relief, and to keep and stimulate positive posture.

According to an aspect of this invention, a mat is designed to be tailored for different user based on user's weight, height, body structure types and health conditions.

According to an aspect of this invention, a mat is designed to be anti-slip for preventing from slipping.

According to an embodiment of this invention, an orthopedic prayer mat is proposed. The orthopedic prayer mat includes four layers, which includes a microfiber layer, a soft polyurethane layer, a hard polyurethane layer/an anti-fatigue layer and an anti-slip layer. The soft polyurethane layer is used to absorb weight, and the hard polyurethane layer/the anti-fatigue layer is used to bear weight. In particular, the soft polyurethane layer and the hard polyurethane layer/the anti-fatigue layer are adhered with a specific angle, and the angle is corresponding to a ratio of weight absorption and weight bearing. The specific angle may be tailored for user based on weight, height, body structure type and healthy conditions to have feeling of most comfort.

The tailored orthopedic prayer mat may be made into two units, the combination of the soft polyurethane layer and the hard polyurethane layer can loaded into or unloaded out of the cover unit. The tailored orthopedic prayer mat may also be made into one single unit, the four layers are combined to one orthopedic prayer mat for convenience.

According to an embodiment of this invention, an orthopedic prayer mat is proposed. The orthopedic prayer mat includes multiple layers and all layers are adhered to be one single unit. The layered orthopedic prayer mat includes a microfiber layer, a soft polyurethane layer, a weight-bearing layer, which may be an anti-fatigue layer, or a hard polyurethane layer or their combination thereof, and an anti-slip layer.

According to another embodiment of this invention, an orthopedic prayer mat is proposed and the layered structure is similar with the single unit embodiment but is made into two units, a cover unit and an inner unit. The inner unit can be loaded into and unloaded from the cover unit. The cover unit comprises a microfiber layer on the top and an anti-slip layer on the bottom, and the peripheries of the top microfiber layer and the bottom anti-slip layer are inseparably combined and an opening is arranged on the cover unit. The opening is usually arranged on the bottom anti-slip layer or the lateral side of the mat, i.e. the border between the top layer and the bottom layer. The inner unit comprises of the combination of a soft polyurethane layer and an anti-fatigue layer or hard polyurethane, and the two layers are inseparably bound, and the anti-fatigue or hard polyurethane is arranged under the soft polyurethane layer. Similar with the above-mentioned, the inner unit can be loaded into or unloaded out of the cover unit, and the cover unit is washable to keep clean.

The microfiber is the top layer for interacting with the user, which is made from a soft and silky material, which can be synthetic or nature and is processed to be water-resistant, anti-dust, heat-resistant and anti-microbial to keep dry, clean and comfortable. The surface of the orthopedic prayer mat will have designs in the form of patterned or illustration added and integrated with the top layer microfiber.

The soft polyurethane layer is designed under the top micro-fabric layer, and is relaxative and has a slow recovery effect (viscoelastic effect) to absorb the initial pressure from the user. The user has the ability to see his posture for corrective purposes within the top layer as the slow recovering polyurethane allows the user to see his footprint, knee print etc. The soft polyurethane layer also provides a buffer, reduces the pressure and reduces the stiffness on his leg, ankle, loins and muscle to ease the stress and to improve the blood circulation.

The anti-fatigue layer or the hard polyurethane layer is arranged under the soft polyurethane layer for bearing/absorbing user's weight. The anti-fatigue layer is stiffer than the soft polyurethane layer and makes the user to keep posture and balance.

The anti-slip layer is designed as the bottom layer of the mat, under the anti-fatigue layer or the hard polyurethane layer, for fixing the mat to the floor. The ant-slip layer prevents slipping in any situation to prevent the user from the physical injury or falling down.

It is emphatically noted that a folding or rolling apparatus can be equipped with to have convenience of storage, and further a handle is applied to the folding or rolling apparatus to have advantage of portability.

DETAILED DESCRIPTION OF THE INVENTION

A new orthopedic prayer mat proposed and explained as follows accompanied with drawings, which is use to explain this invention for better understanding but not limit this invention.

The top layer is made of microfiber and processed to be anti-microbial, anti-moldy, water-resistant, anti-dust, heat-resistant and antimicrobial, and will have designs on the top in the form of patterns or illustration including embossing effects added. The bottom layer is made to be anti-slip for preventing the user from physical injuries or falling down in any situation. The soft polyurethane layer and the anti-fatigue layer are arranged under the top microfiber layer in order to ease the initial pressure from and to provide the support to the user, respectively.

The description includes four parts. Part I describes the fundamental of this invention, part II lists some exemplary embodiments with a detail description and drawings for explaining this invention, part III introduces the apparatus of storage and portability and part IV enumerates the alternative material, which may be used in the orthopedic prayer mat.

Part I: The Fundamental of the Orthopedic Prayer Mat.

The surface of the orthopedic prayer mat, the face interacting with the user, may be designed to have a stylish look, comfortable touch and a slow recovery effect to allow the user to see his posture in the mat such as his footprint, to reduce ankle, leg, joint and back stress and to improve the blood circulation.

Figure 1:
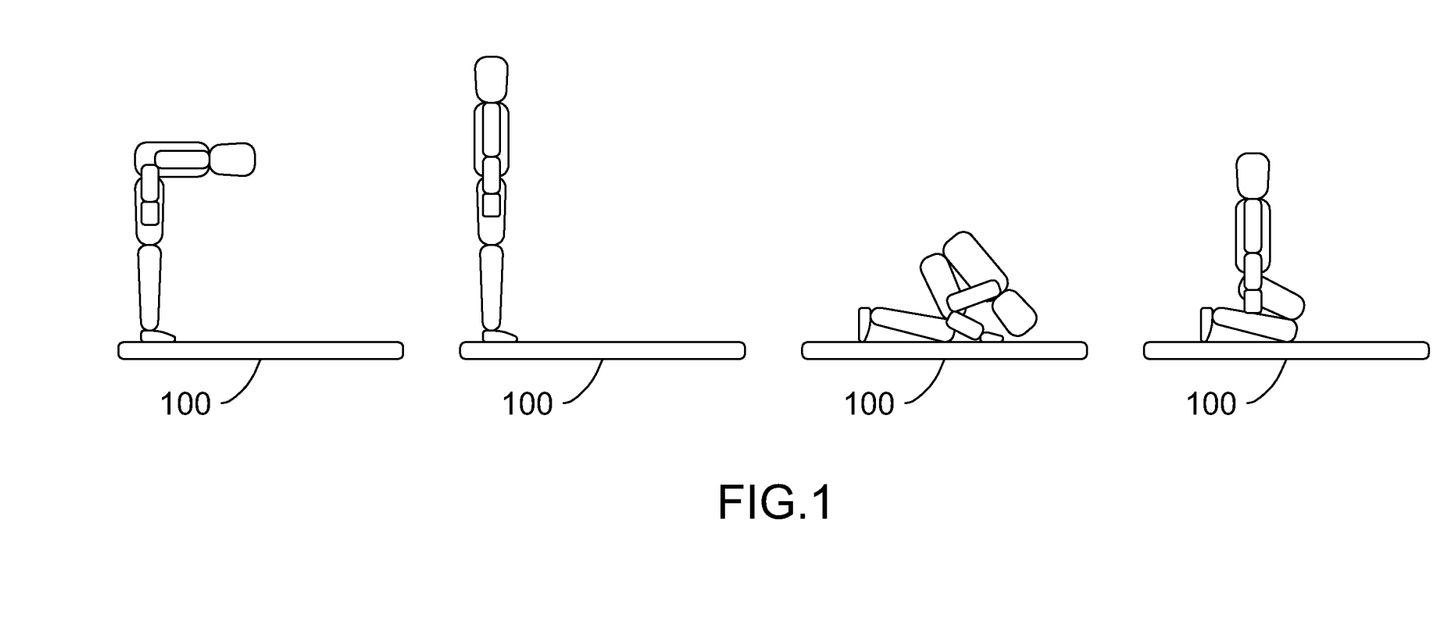
FIG. 1 shows the various activities of a user on a prayer mat.

FIG. 1 shows the various activities, such as standing, bending, kneeling and sitting, for meditation and prayer on a prayer mat 100, and the top layer interacts with the user and may be sweated. Once the mat is perspired, the damp mat causes discomfort and easily breeds the bacteria or molds. Therefore, the top layer should meet the requirements of having a nice look, a comfortable touch, dry and clean.

The top layer is made of microfiber, which can be a synthetic or natural material, and may have designs in the form of patterned or illustrations or embossing effects added on to have a specialized look according to specialized designs tailored to interacting with the users by stimulating them through visual attraction. The surface of the top microfiber layer is processed to be antimicrobial, anti-moldy, water-resistant, anti-dust and heat-resistant to have a clean, dry and safe interface.

When the user stands, bends down, sits or kneels on the mat, his/her weight or pressure concentrates on the mat.

When the mat is too stiff, it compresses the user's joints and muscle and affects the blood circulation and causes pain; and when the mat is too soft, it is difficult to keep posture and balance to make the joints and muscle sore. Regardless of being too stiff or soft, if the position is prolonged, it causes ankle, leg, knee and back injuries including other possible related health issues.

The soft polyurethane layer initially absorbs user's pressure and the hard polyurethane layer absorbs user's weight with a buffer. As a result, the ankle, leg, muscle, knee and back pain are relieved, the blood circulation is stimulated and the stiffness in joints is eased.

The bottom layer is an anti-slip layer for preventing the user from slipping, and that might cause serious problems, such as falling down.

Part II: Exemplary Embodiments of this Invention.

Figure 2A:
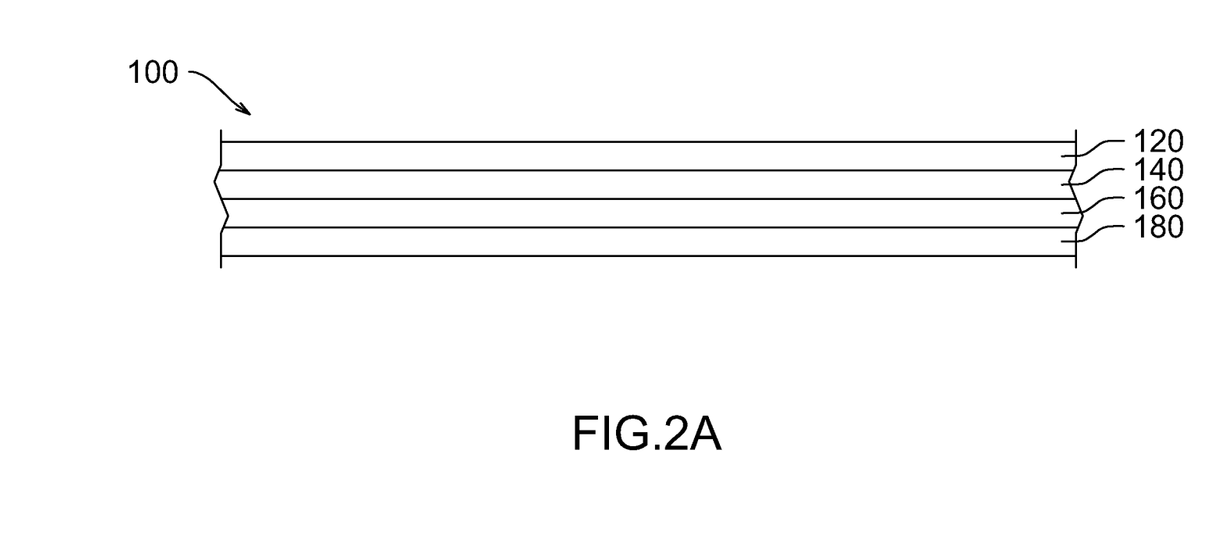
FIG. 2A shows a 4-layered single-unit orthopedic prayer mat according to an exemplary embodiment of this invention, which comprises 4 layers and are inseparably adhered to form a single-unit mat.

A structure with multiple layers is proposed to implement the design of gradual varying stiffness. The orthopedic prayer mat may be made into one single unit, such as the embodiments are shown as FIG. 2A. The embodiment shown as FIG. 2A is a 4-layered orthopedic prayer mat. The orthopedic prayer mat can be made into two units, one is a cover unit and the other is an inner unit, shown as FIG. 3A, and the inner unit can be loaded into and unloaded out of the cover unit. A particular embodiment is shown as FIG. 4A, which includes a soft polyurethane layer and a hard polyurethane layer or anti-fatigue layer and they are adhered together at an angle to have different proportion between the soft and hard polyurethane layer in horizontal direction. The angle is designed for user's weight, height, body structure type and healthy conditions. The angle ratio balances the weight bearing and absorption adjusting to the user's conditions. This ratio is pre-produced accordingly to each market and its demographic makeup optimizing common conditions among the population The embodiment, shown as FIG. 2A, the orthopedic prayer mat 100 includes a microfiber layer 120, a soft polyurethane layer 140, an anti-fatigue layer 160 and an anti-slip layer 180 from top to bottom.

The top is a microfiber layer and the top microfiber layer 120 may be processed to be antimicrobial, mold-resistant, water-resistant, anti-dust and heat-resistant. As a result, the mat may have design flexibilities in the pattern of microfiber and/or illustrations added thereon and have advantages of being anti-microbial, clean, safe and dry.

A soft polyurethane layer 140, which is relaxative with a viscoelastic effect, is arranged beneath the microfiber layer 120 and provides a buffer for absorbing the initial pressure from the user.

The anti-fatigue layer 160 follows the soft polyurethane layer 140 to provide the support for bearing and absorbing user's weight to form a 4-layered orthopedic prayer mat, shown as FIG. 2A.

Figure 2B:
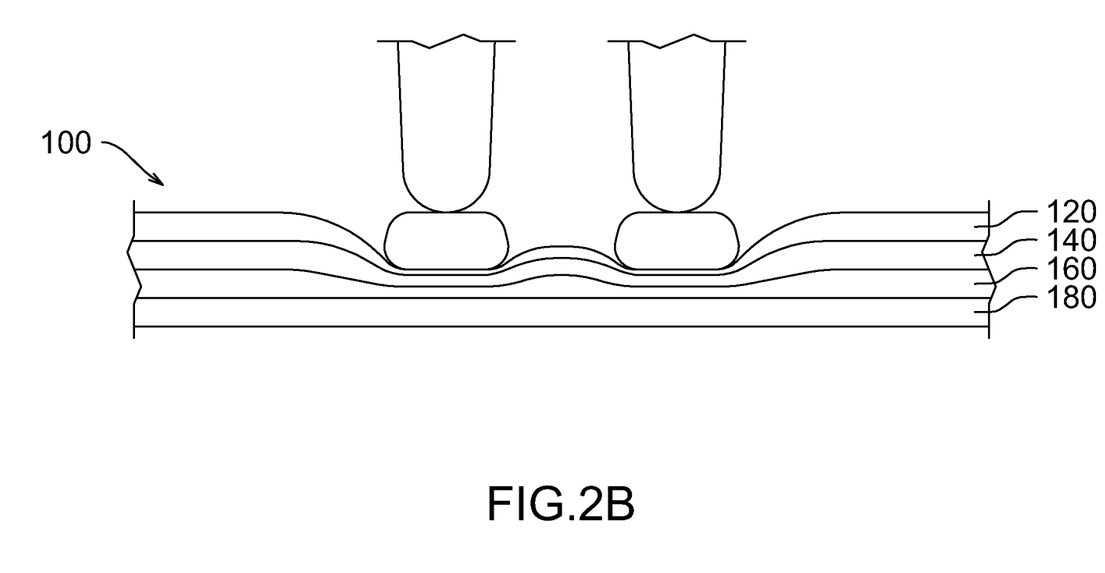
FIG. 2B shows the situation of standing on the orthopedic prayer mat of this invention to show the stress reduction of the pressure, and the soft polyurethane layer provides a buffer to absorb the pressure and to make the back, joint, leg, ankle and shin more comfortable, and the anti-fatigue layer retains the weight for pressure relief and support.

The FIG. 2B shows the situation that the user is standing, bending, kneeling or sitting on the mat. The user weight/pressure is initially absorbed by the soft polyurethane layer 140, and then is passed down to the anti-fatigue layer 160. As a result, the stress is gradually reduced and the buffer provided by the soft polyurethane layer and the hard polyurethane layer can improve the problems of blood circulation. Further, since the soft polyurethane layer 140 has the slow recovery effect, so the user can observe the weight distribution after a certain activity and can improve posture to have medical benefits.

The bottom layer is an anti-slip layer 180 and the bottom layer prevents the mat 100 from slipping and prevents the user from falling down.

Figure 3A:
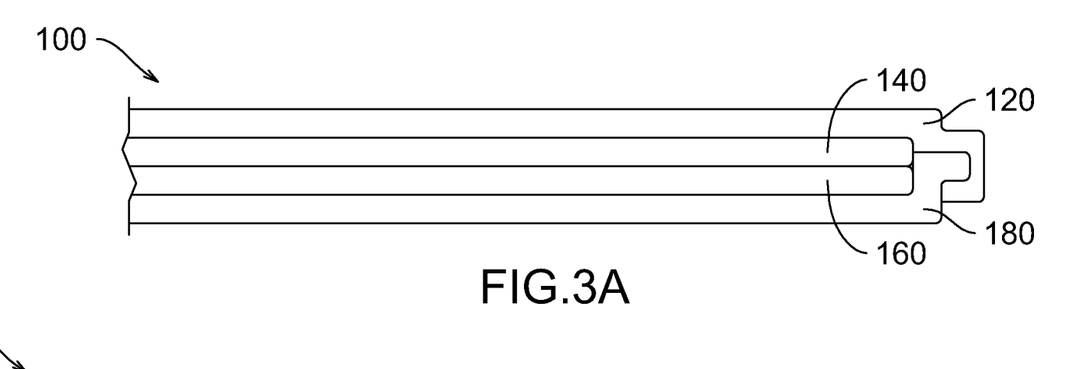
FIG. 3A shows a two-unit 4 layered orthopedic prayer mat according to another exemplary embodiment of this invention and the mat is made into two units, one is a cover unit and the other is an inner unit. The peripheries of the cover unit and the inner unit are sewed, glued or cohered, and the inner unit may be loaded into and unloaded out of the cover unit through an opening.

An orthopedic prayer mat 100 shown as FIG. 3A, according to another embodiment of this invention, is made into two units, one is a cover unit 200 and the other is an inner unit 300. The cover unit 200 comprises a microfiber layer 120 and an anti-slip layer 180, and the peripheries of the microfiber layer 120 and the anti-slip layer 180 is inseparably bound by some means, like stitching, sewing, gluing or adhering . . . and so on. The inner unit 300 comprises a soft polyurethane layer 140 and an anti-fatigue layer 160, and these two layers are inseparably bound by means, like gluing or adhering . . . and so on. This embodiment is similar with that shown as FIG. 2A and has 4-layered structure but is made to be two-unit.

Figure 3B:
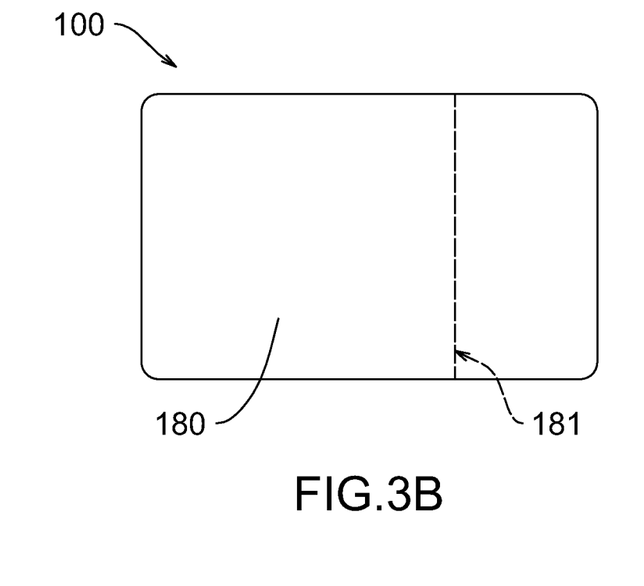
FIG. 3B shows the opening of the cover unit of the embodiment shown as FIG. 3A for loading and unloading the inner unit, and the opening is arranged on the bottom face of the cover unit.
Figure 3C:
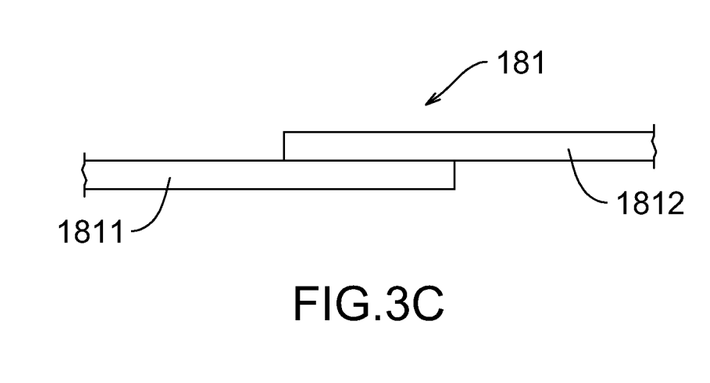
FIG. 3C shows the structure of the opening of the embodiment shown as FIG. 3A, wherein the anti-slip layer comprises two pieces and the pieces has an overlapped part to form a hidden opening.

An opening is arranged on the cover unit 200 for loading or unloading the inner unit 300 and the opening can be arranged on the lateral side of the cover unit 200 or on the bottom face. FIG. 3B illustrates an embodiment that an opening 181 is arranged on the bottom face of the cover unit 200, i.e. on the anti-slip layer 180. The structure of the opening 181 is illustrated in FIG. 3C, and the anti-slip layer 180 is made into two pieces 1811 and 1812 with an overlapped part between these two pieces so as to form a hidden opening. Alternatively, to simplify the structure, a zipper may be arranged on the lateral side of the cover unit 200 (not shown). The cover unit 200 can be washed to keep clean when the inner unit 300 is unloaded.

Figure 4A:
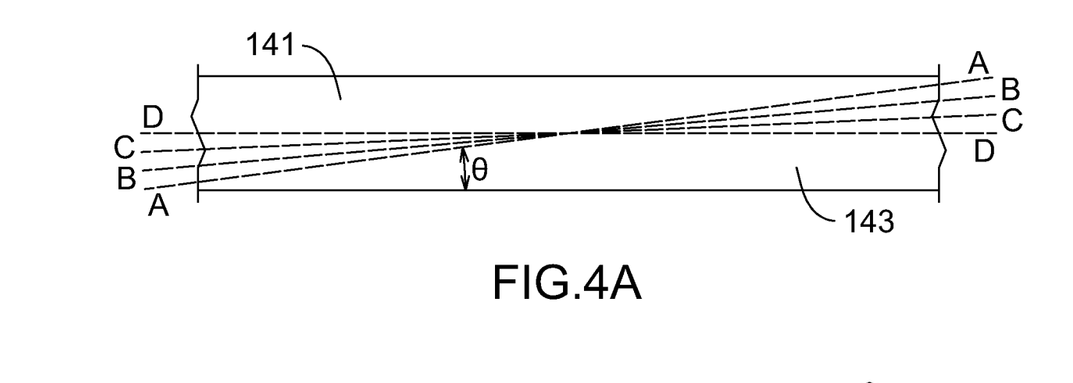
FIG. 4A shows a combination of a soft polyurethane layer and a hard polyurethane or anti-fatigue layer, and they are adhered together at an angle, and the angle is used to adjust the ratio of weight absorption and weight bearing.

FIG. 4A shows a combination of a soft polyurethane layer 141 and a hard polyurethane layer (or an anti-fatigue layer) 143, and they are adhered together at an angle θ, which the angle of inclination and the angle θ is ranging from 0 to 45 degree. Different angles are corresponding to different proportions between the soft polyurethane layer 141 and the hard polyurethane layer/the anti-fatigue layer 143 in location. The soft polyurethane layer 141 absorbs the pressure initially to provide a comfort and the hard polyurethane layer/the anti-fatigue layer 143 creates a buffer to bear user's weight. Therefore, different angles have different ratio of weight absorption and weight bearing, and the hard end of the mat has a larger proportion of hard polyurethane layer and soft end has a larger proportion of soft polyurethane layer. The more is the inclination angle θ, the more is the weight absorption and the less is the weight bearing. In the embodiments shown in FIG. 4A, four angles are enumerated. Angle A is more weight absorption, angle B is more weight bearing, angle C is slight weight bearing and absorption balance and angle D, which is 0 degree of inclination, is flat weight bearing and absorption balance. The inclination angle θ is tailored based on the user type and healthy conditions.

Figure 4B:
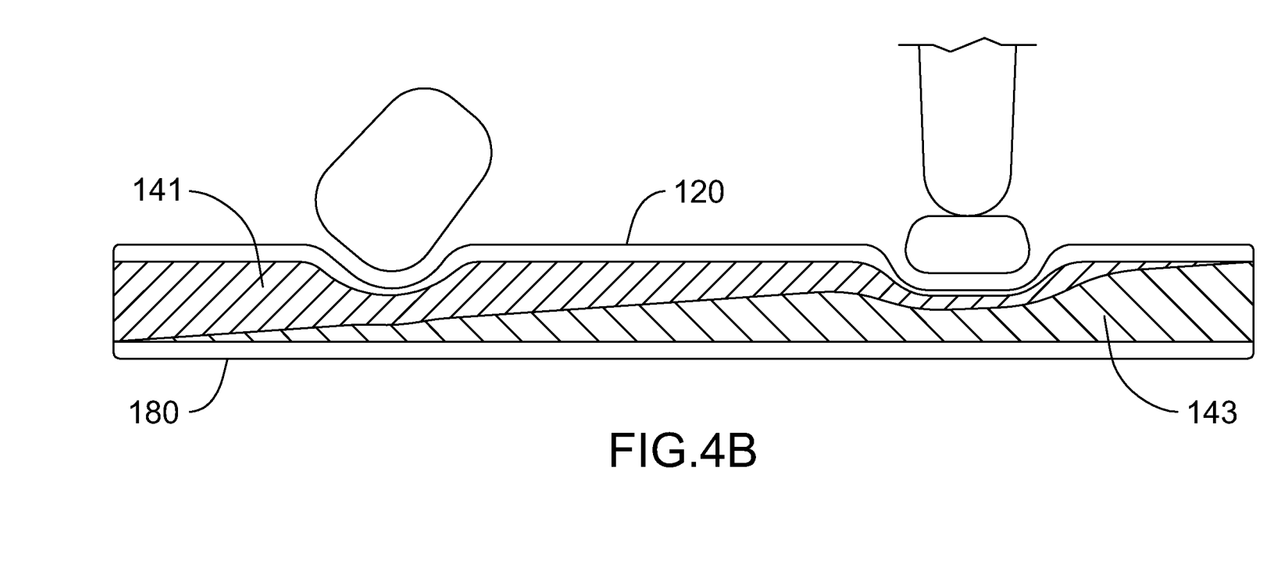
FIG. 4B shows the usage of an orthopedic prayer mat, which uses the combination of the soft polyurethane layer and hard polyurethane layer or anti-fatigue layer. The mat is pressed by the head (shown as the left of the figure) and pressed by feet (shown as right of the figure) in kneeling.

FIG. 4B shows the usage of the combination of the soft polyurethane layer 141 and the hard polyurethane layer 143 in orthopedic prayer mat, and the user puts feet on the hard end (left side in figure) for bearing user's weight with a buffer and head on the soft end (right side in figure) for initially absorbing pressure from the user. It is obvious that the mat can be flip and has reverse output. The design allows the orthopedic prayer mat to be suitable for users with different conditions and characteristics.

Similar with the embodiment shown as FIG. 3A, the orthopedic prayer mat can be made into two units. The combination of the soft polyurethane layer 141 and the hard polyurethane layer 143 is as an inner unit, and the microfiber layer 120 and the anti-slip layer 180*n* are combined to be as a cover unit. Also, the inner unit can be loaded into or unloaded out of the cover unit.

Part III: The Apparatus of Storage and Portability

Figure 5A:
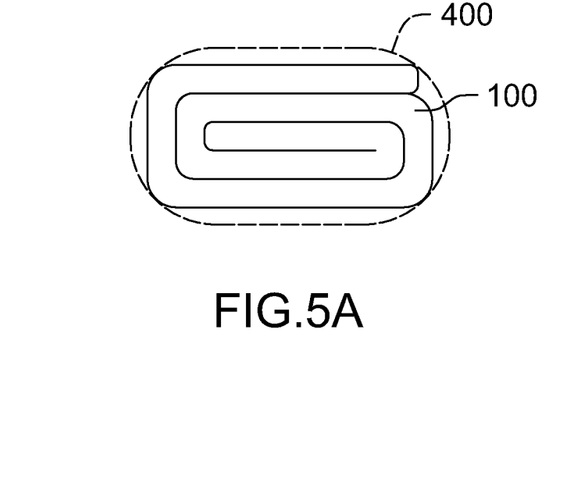
FIG. 5A shows a rolled orthopedic prayer mat with an apparatus for storage according to this invention, and the apparatus may be implemented by a type of button tape, glue tape or a hook-and-loop fastener type is arranged for fastening.
Figure 5B:
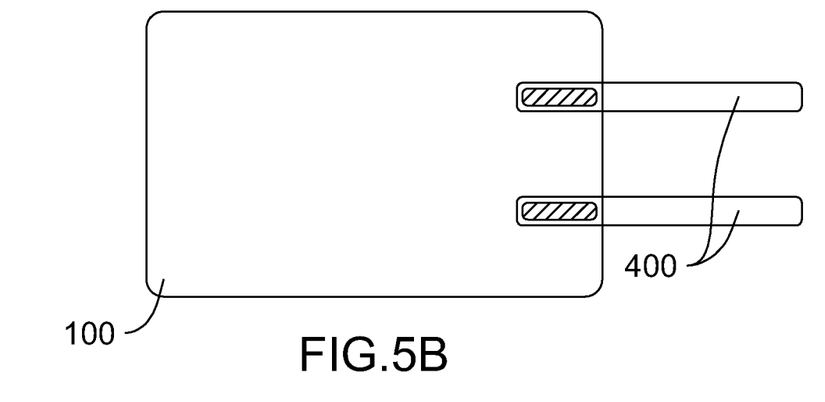
FIG. 5B shows that two hook-and-loop fastener tapes are arranged on one end of the bottom face of the anti-slip layer in the embodiment shown as FIG. 5A.
Figure 5C:
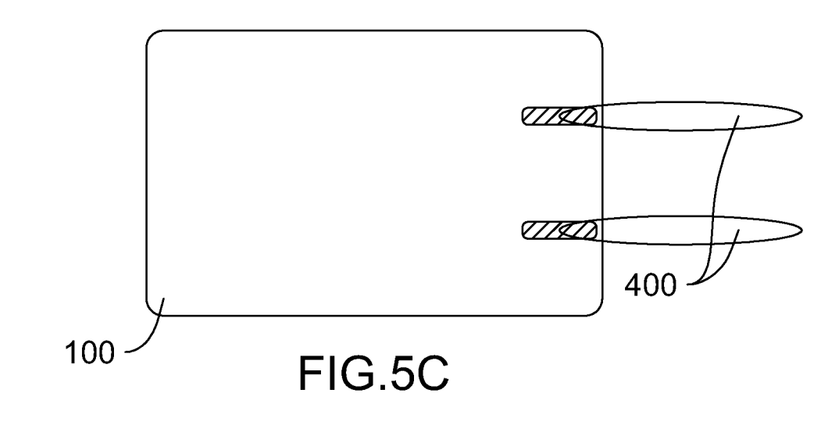
FIG. 5C shows that two elastic bands are arranged on one end of the bottom face of the anti-slip layer in the embodiment shown as FIG. 5A.

According to this aspect, the orthopedic prayer mat is made to be foldable or rollable. FIG. 5A illustrates an rolled orthopedic prayer mat 100 and at least one tape 400 is arranged on the mat for tying up and usually the tape 400 is arranged on the bottom face of the anti-slip layer. Two tapes 400, referring to the FIG. 5B, are arranged, and one end of each is sewed, adhered or glued on the anti-slip layer 180 and the other end extends out the mat 100 to tie up the rolled mat. The tape may be a hook-and-loop fastener type of tape or a button type of tape, which is a tape equipped with buttons for fastening the rolled orthopedic prayer mat. Alternatively, it may be an elastic band illustrated in FIG. 5C.

Figure 6A:
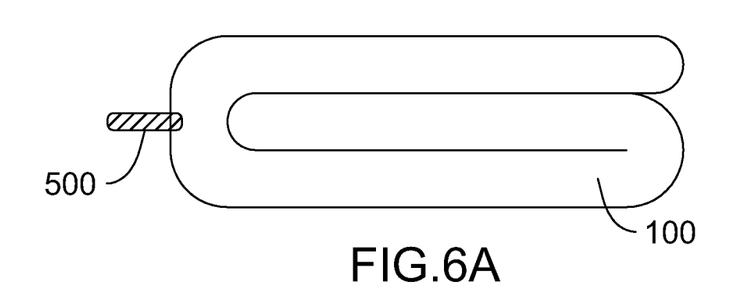
FIG. 6A shows a 3-folded orthopedic prayer mat according to this invention, wherein a handle is arranged.
Figure 6B:
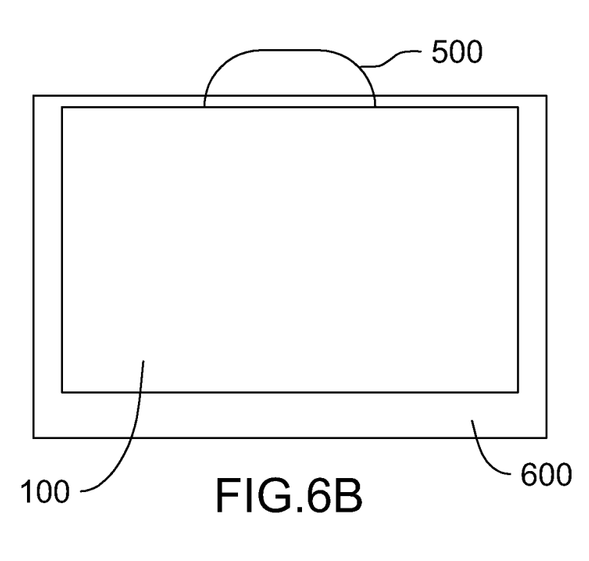
FIG. 6B shows package of a folded orthopedic prayer mat according to the embodiment shown as FIG. 6A, wherein the handle passes through the package for convenience of carrying.
Figure 6C:
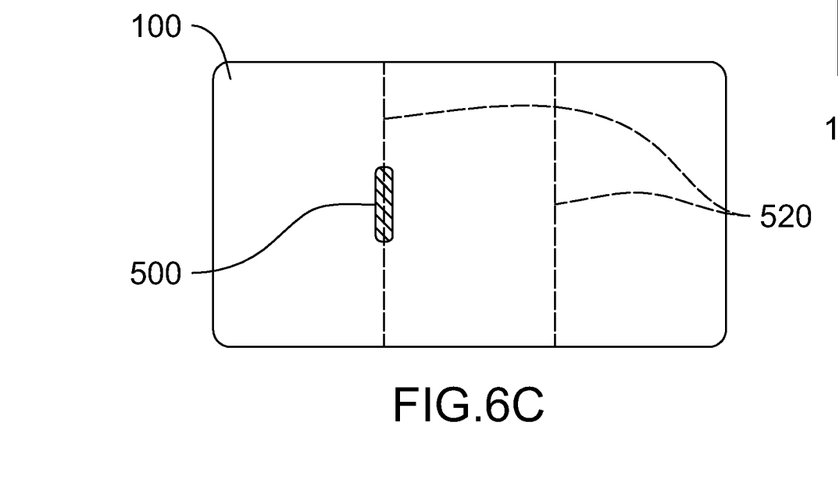
FIG. 6C shows the top view of the handle of the orthopedic prayer mat according to the embodiment shown as FIG. 6A, wherein two folding lines are arranged and each is at ⅓ length from the edge of the mat, and the handle is arranged on one of the both lines.

FIG. 6A, FIG. 6B and FIG. 6C illustrate a 3-fold folding apparatus for the orthopedic prayer mat 100 and a handle 500 is equipped on the mat 100. FIG. 6A shows a folded orthopedic prayer mat 100, and the mat 100 is folded twice to form a 3-fold folded mat and a handle is arranged on the mat 100. At least one button may be equipped with for buckling up the folded mat (not shown). FIG. 6B show a package 600 of the folded mat 100 and the handle 400 passes through the package 600 for convenience to carry and store the mat 100. FIG. 6C shows the bottom view of the orthopedic prayer mat 100 and the handle 400 is sewed on the folding line 520, which is a virtual line. The folding lines is at ⅓ length of the mat 100 from the edge.

Figure 7A:
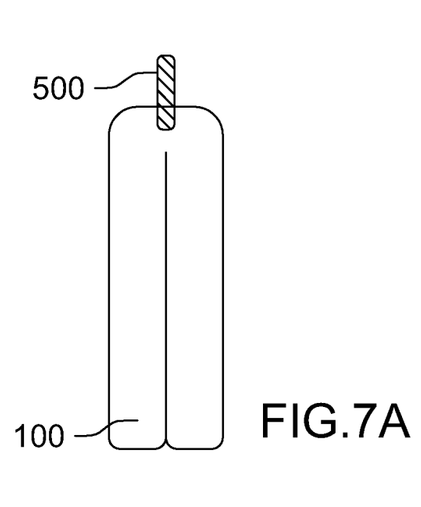
FIG. 7A shows a 2-folded orthopedic prayer mat according to this invention, wherein a handle is arranged.
Figure 7B:
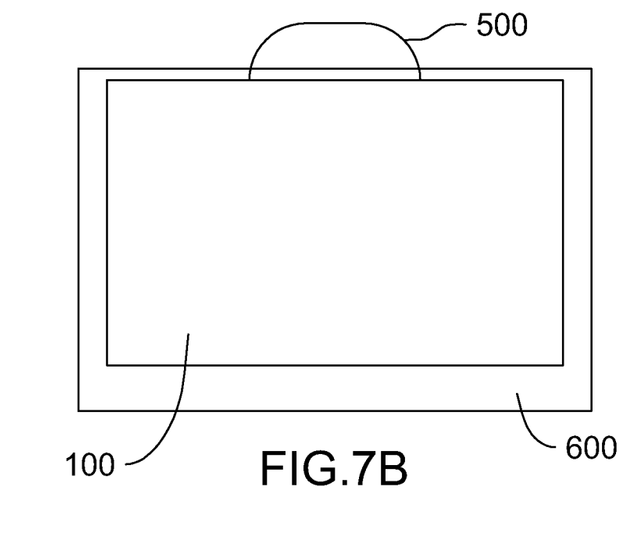
FIG. 7B shows package of a folded orthopedic prayer mat according to the embodiment shown as FIG. 7A, wherein the handle passes through the package for convenience of carrying.
Figure 7C:
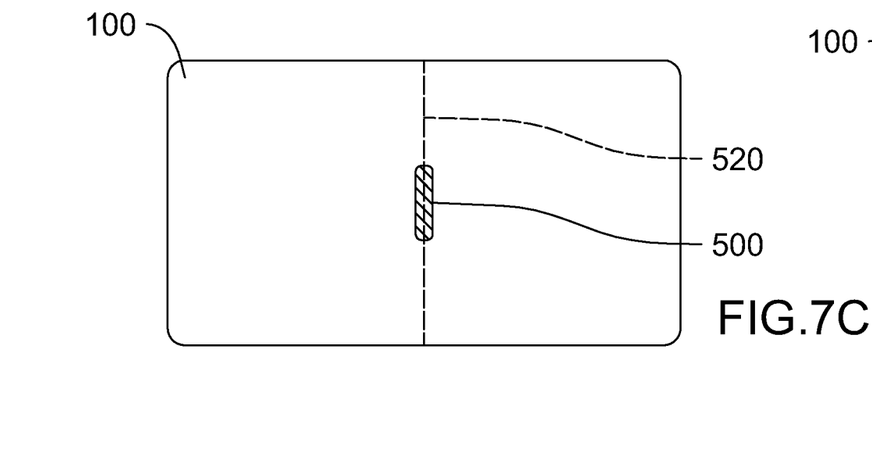
FIG. 7C shows the top view of the handle of the orthopedic prayer mat according to the embodiment shown as FIG. 7A, wherein one folding line is arranged at the center of the mat, and the handle is arranged on the line.

FIG. 7A, FIG. 7B and FIG. 7C illustrate a 2-fold folding apparatus for an orthopedic prayer mat 100, and a handle 500 is equipped on the mat 100. The orthopedic prayer mat 100 is folded once to form a 2-fold folded mat for storage and carrying, shown as FIG. 7A, and similar with the 3-folded embodiment, at least one button is equipped with for buckling up the mat. FIG. 7B shows the package of a folded orthopedic prayer mat 100, that is similar with the above embodiment, and the handle 500 passes through the package for convenience of carrying. FIG. 7C shows the bottom view of the orthopedic prayer mat 100 and the handle 500 is sewed adhered or glued on a folding line 500, which is at the center of the mater 100.

It is emphatically that the rolling or folding can be equipped on the multiple-layered mat, and on the one-unit or two-unit mats, which can fasten the mat and be designed as a handle to have convenience of storage and portability.

Part IV: The Material of an Orthopedic Prayer Mat

The microfiber layer may be a synthetic or natural material, like polyester, polyamide, nylon, cotton, flannelette or their mixture. It is emphatically noted that the surface interacting with the user is processed to be antimicrobial, anti-moldy, water-resistant, anti-dust and heat-resistant and washable. Also, the microfiber layer may be designed to have a stylish and customized look.

The polyurethane layer is called PU foam layer, which has a slow recovery effect (viscoelastic effect) and is also called a memory foam layer. The stiffness is controllable and determined by its density, the additives, vaporized rate and vaporization process.

In the embodiments with multiple layers, the stiffness increases layer-by-layer from top to bottom. In the 4-layered embodiments mentioned above, the soft polyurethane layer is arranged beneath the top microfiber layer, and then the stiffer hard polyurethane layer or the anti-fatigue layer is arranged beneath the soft polyurethane layer.

The anti-fatigue layer may be made from polyvinylchloride, polyurethane, rubber, rubberized gel-foam, gel-foam, gel, plastic materials, polypropylene or ethylene vinyl acetate . . . and so on.

The anti-slip layer can be made from rubber and processed to be slip resistant.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An orthopedic prayer mat comprising:
a microfiber layer configured at the top and processed to be antimicrobial, anti-moldy, water-resistant and anti-dust;
an anti-slip layer configured at the bottom to avoid slipping; and
a combination of a polyurethane layer and an anti-fatigue layer,
wherein
the polyurethane layer and the anti-fatigue layer are adhered together at an angle to have a different ratio of the polyurethane layer to the anti-fatigue layer in a horizontal direction to have an end with more proportional anti-fatigue layer to bear more user weight and an end with more proportional polyurethane layer to absorb more user weight to so as to balance user weight bearing and absorption,
the combination is arranged between the microfiber layer and the anti-slip layer,
the angle ranges from 0 to 45 degree except for 0 degree, and
the angle is designed according to an user's conditions and characteristics,
wherein the polyurethane layer and anti-fatigue layer each extend to all points along a horizontal surface of the mat.

2. The orthopedic prayer mat according to claim 1, wherein the anti-fatigue layer is made from polyvinylchloride, polyurethane, rubber, rubberized gel-foam, gel-foam, gel, plastic materials, polypropylene or ethylene-vinyl-acetate.

3. The orthopedic prayer mat according to claim 1, wherein the microfiber layer, the anti-slip layer and the combination are inseparably adhered, glued or sewed together to be one single unit.

4. The orthopedic prayer mat according to claim 1, wherein the peripheries of the microfiber layer and the anti-slip layer are sewed, glued or adhered together to form a cover unit, wherein an opening is arranged on the cover unit, and the combination is loaded into or unloaded out of the cover unit through the opening.

5. The orthopedic prayer mat according to claim 1 further comprising a rolling apparatus, wherein the rolling apparatus is arranged on the bottom face of the anti-slip layer and contains at least one hook-and-loop fastener, button, or elastic, tape for the rolled orthopedic prayer mat.

6. The orthopedic prayer mat according to claim 1 further comprising a folding apparatus, wherein the folding apparatus comprises a handle and at least one tape, wherein the handle is arranged on the bottom face of the anti-slip layer and the tape is equipped with buttons for fastening the folded orthopedic prayer mat.

7. An orthopedic prayer mat comprising:
a microfiber layer processed to be anti-microbial, anti-moldy, water-resistant and anti-dust;
a polyurethane layer arranged beneath the microfiber layer to provide buffering for absorbing the initial pressure from a user;
an anti-fatigue layer arranged beneath the polyurethane layer,
wherein
the anti-fatigue layer is stiffer than the polyurethane layer to provide support for bearing the user's weight, and an angle is designed between the polyurethane layer and the anti-fatigue layer according to the user's conditions and characteristics so as to have a different ratio of the polyurethane layer to the anti-fatigue layer in a horizontal direction, the ratio varying rate is determined by the angle, the angle ranges from 0 to 45 degree except for 0 degree, and an anti-slip layer arranged beneath the anti-fatigue layer to prevent the user from slipping, wherein the microfiber layer, the polyurethane layer, the anti-fatigue layer and the anti-slip layer are adhered, glued or sewed together to form a single unit; and wherein the polyurethane layer and anti-fatigue layer each extend to all points along a horizontal surface of the mat.

8. The orthopedic prayer mat according to claim 7, wherein the anti-fatigue layer is made from polyvinylchloride, polyurethane, rubber, rubberized gel-foam, gel-foam, gel, plastic materials, polypropylene or ethylene-vinyl-acetate.

9. The orthopedic prayer mat according to claim 7 further comprising a rolling apparatus, wherein the rolling apparatus is arranged on the bottom face of the anti-slip layer and contains at least one hook-and-loop fastener, button, or elastic, tape for the rolled orthopedic prayer mat.

10. The orthopedic prayer mat according to claim 7 further comprising a folding apparatus, wherein the folding apparatus comprises a handle and at least one tape, wherein the handle is arranged on the bottom face of the anti-slip layer and the tape is equipped with buttons for fastening the folded orthopedic prayer mat.

11. The orthopedic prayer mat according to claim 7, wherein the microfiber layer is made from flannelette, polyester, polyamide, nylon, cotton or a combination thereof.

12. An orthopedic prayer mat comprising:

a microfiber layer made from flannelette, polyester, polyamide, nylon, cotton or a combination thereof configured at the top and processed to be antimicrobial, anti-moldy, water-resistant and anti-dust;

an anti-slip layer configured at the bottom to avoid slipping; and a combination of a polyurethane layer and an anti-fatigue layer, wherein the polyurethane layer and the anti-fatigue layer are of substantially the same size and substantially the same shape of a right triangle, where said polyurethane layer and anti-fatigue layer are adhered together at an angle and are to form the combination, and the combination is arranged between the microfiber layer and the anti-slip layer, and the angle ranges from 0 to 45 degree except for 0 degree to make the ratio of the polyurethane layer to the anti-fatigue layer vary over entirety of the mat to increase the amount of the polyurethane layer relative to the anti-fatigue layer from one end to another end, wherein the angle corresponds to a ratio between weight absorption and weight bearing, and the ratio is designed according to an user's conditions and characteristics.

13. The orthopedic prayer mat according to claim 12, Wherein the polyurethane layer and an anti-fatigue layer substantially have a form in a shape of a right triangle and the angle is substantially 45 degrees.

* * * * *